United States Patent
Yang

(10) Patent No.: US 8,941,934 B2
(45) Date of Patent: Jan. 27, 2015

(54) LENS CONNECTION MODULE AND CONNECTION ADAPTER FOR SAME

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 5 days.

(21) Appl. No.: 13/421,842

(22) Filed: Mar. 15, 2012

(65) Prior Publication Data

US 2012/0236424 A1    Sep. 20, 2012

(30) Foreign Application Priority Data

Mar. 16, 2011   (TW) .............................. 100108890 A

(51) Int. Cl.
G02B 7/02 (2006.01)
G02B 7/14 (2006.01)
G03B 17/12 (2006.01)
G03B 17/56 (2006.01)

(52) U.S. Cl.
CPC *G02B 7/14* (2013.01); *G02B 7/022* (2013.01); *G03B 17/12* (2013.01); *G03B 17/565* (2013.01)
USPC .......................................... 359/827; 396/530

(58) Field of Classification Search
USPC ............ 348/360, 361, 375; 396/17, 529–533, 396/544; 359/819, 827–830, 903
See application file for complete search history.

(56) References Cited

U.S. PATENT DOCUMENTS

| | | | |
|---|---|---|---|
| 3,896,463 A * | 7/1975 | Laskey ........................ | 396/544 |
| 7,821,569 B2 | 10/2010 | Yang | |
| 7,853,137 B2 | 12/2010 | Yang | |
| 2003/0053804 A1* | 3/2003 | Takeshita et al. ............. | 396/286 |
| 2006/0233545 A1* | 10/2006 | Senba et al. ................... | 396/529 |
| 2010/0225429 A1* | 9/2010 | Tsai .............................. | 335/219 |
| 2011/0181947 A1 | 7/2011 | Yang | |
| 2012/0039593 A1 | 2/2012 | Yang | |
| 2012/0075861 A1 | 3/2012 | Yang | |

FOREIGN PATENT DOCUMENTS

JP            8-227096       *   9/1996   ............. G03B 17/14

OTHER PUBLICATIONS

U.S. Appl. No. 13/092,314, filed Apr. 22, 2012, to Chih-Yi Yang, entitled "Adaptive lens module and image capturing apparatus".

* cited by examiner

*Primary Examiner* — Darryl J Collins
*Assistant Examiner* — Gary O'Neill

(57) ABSTRACT

A lens connection module is disclosed, which can be magnetically installed on an image capture device having a light entry opening and a first magnetic unit, and comprises a lens connection body and a second magnetic unit installed on the lens connection body for magnetically connecting to the first magnetic unit. The lens connection body includes a light collecting pathway corresponding to the light entry opening and extending along a light axis, the first magnetic unit has at least one ferromagnetic component arranged on the front face in a radially asymmetric manner, and the second magnetic unit has a magnetic component corresponding to the ferromagnetic component and installed on a joint face. As such, the lens connection module allows quick installation onto and detachment from the image capture device, thereby increasing application flexibility and operation convenience of the image capture device.

6 Claims, 6 Drawing Sheets

LENS CONNECTION MODULE AND CONNECTION ADAPTER FOR SAME

BACKGROUND OF THE INVENTION

1. Field of the Invention

The present invention generally relates to a lens connection module and a connection adapter for the same. In particular, the invention relates to a lens connection module magnetically installed on an image capture device and a connection adapter for the same.

2. Description of Related Art

As digital cameras and mobile phones provide features like immediate image preview and easy exportation to computer-related devices, they have been quickly replacing conventional film cameras and become the mainstream on current camera market. Typically, the zoom adjustment in this type of image capture devices spans at most approximately a range of ten something folds, which supports only image shooting for general views, but not applicable for significant zoom-in or zoom-out landscape photography. To resolve these issues, it is quite often to externally connect a high magnification lens, a micro-lens or a short-range light supplement device to the image capture device. Conventional lens connection modules establish the connection essentially by means of, for example, a threaded connection ring.

In a typical single lens camera, the front end of the lens is internally threaded and, therefore, it is relatively convenient to attach an additional filter, a polarized lens, a connection ring or other peripheral equipments thereto. However, as the advent of digital cameras and mobile phones, differences indeed exist in various product specifications no matter with regards to lens diameter, lens retraction, lens configuration/profile or other aspects, so it is inevitable to be confronted with difficulties in, upon using digital cameras and mobile phones of different specifications, how to, on one hand, make the lens connection module conform to various specifications and, on the other hand, to facilitate simple attachment/detachment with assured joint robustness.

Moreover, in addition to general uses, the short-range photography derives many special applications, including cash money counterfeit, medical cosmetology business, dermatological diagnoses and treatments, criminal identifications and so on. The short-range image capturing processes for these purposes usually require additional light supplement. Especially, in the case where fluorescent light is involved in certain technical fields, it needs to employ, for example, a short-range light supplement device which emits ultra-violet (UV) light or even has a feature allowing quick alternation between UV light emission and visible light emission. Accordingly, this sort of auxiliary devices for light supplement or image capture may require convenient assembly and disassembly operations from time to time. However, the attachment and detachment operations on a connection adapter of a conventional lens need both hands to proceed. That is, with one hand fixedly holding on the lens of the single lens camera, the other hand rotates the filter or other peripheral equipment, which is obviously not handy enough and may take overly long time to complete such relative rotations thus causing inconvenience in user's operation.

Therefore, there is a need to provide a lens connection module which has a fixation mechanism with a reduced volume and also maintains the original appearance and application convenience of the digital camera.

SUMMARY OF THE INVENTION

An objective of the invention is to provide a lens connection module magnetically engageable with an image capture device, thereby realizing simple combination and detachment and further facilitating convenience in product usage.

Another objective of the invention is to provide a lens connection module using a simple structure of magnetic attraction to an image capture device, thereby simplifying the module structure and reducing manufacture cost.

Yet another objective of the invention is to provide a lens connection module using an asymmetric structure for joint to an image capture device, thereby effectively eliminating the problem of erroneous installation direction.

Still another objective of the invention is to provide a connection adapter allowable for application in conjunction with an external lens, which, on one hand, can be attached to an image capture device by means of magnetic attraction and, on the other hand, is adapted to receive a standard lens.

The lens connection module according to the invention is adapted for being magnetically mounted on an image capture device. The image capture device is formed with a light entry opening and provided with a first ferromagnetic unit. The lens connection module comprises a lens connection body, comprising a joint face for facing toward the light entry opening, and a light entry face opposite to the joint face; and a second magnetic unit, mounted on the lens connection body and adapted to magnetically connect the joint face to the first ferromagnetic unit.

To increase application flexibility and allow utilization of a conventional lens, a connection adapter is further described below. The connection adapter is adapted for being magnetically mounted on an image capture device. The image capture device is formed with a light entry opening and provided with a first ferromagnetic unit. The connection adapter is also adapted for mounting an external lens in front of the light entry opening of the image capture device. The connection adapter comprises a base unit, comprising a joint face for facing toward the light entry opening, wherein the base unit includes a pathway wall which defines a light collecting pathway and adapted to engage the external lens; and a second magnetic unit, mounted on the base unit and adapted to magnetically connect the joint face to the first ferromagnetic unit.

Through the aforementioned structure, the invention improves complicated joint architecture and tedious un-installation steps, thus allowing simplified use and structure cost reductions, and providing a foolproof design for further preventing installation angle deviation from expectation as well. By using magnetic attraction, the joint and detachment operations of the lens connection module according to the invention and an image capture device become relatively convenient, so manufacture costs can be saved and the user can easily complete installation and un-installation processes with one hand thus practically elevating the integral performance.

BRIEF DESCRIPTION OF THE DRAWINGS

The aforementioned and other technical contents, aspects and effects in relation with the present invention can be clearly appreciated through the detailed descriptions concerning the preferred embodiments of the invention in conjunction with the appended drawings.

DETAILED DESCRIPTION OF THE PREFERRED EMBODIMENTS

Figure 1:
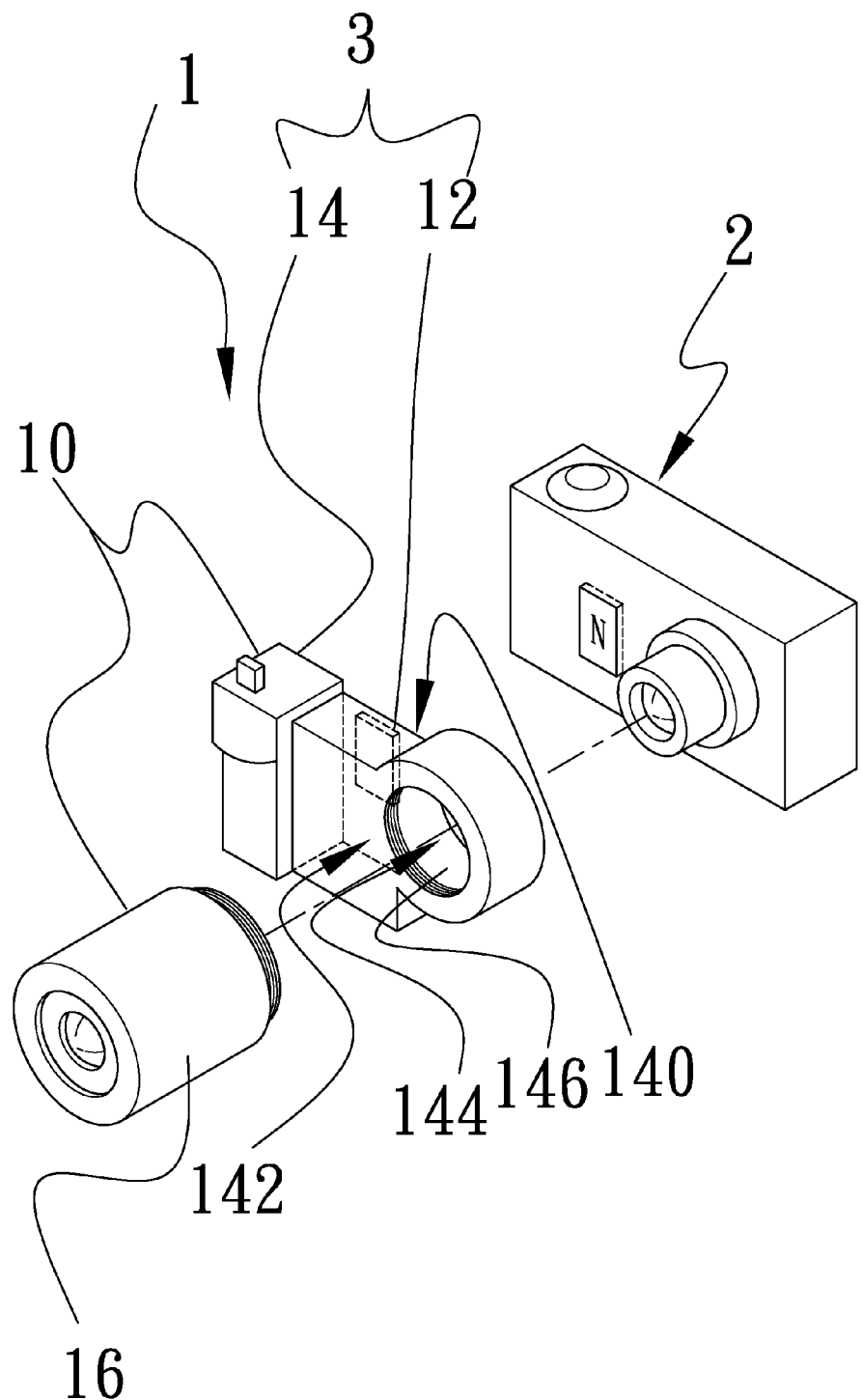
FIG. 1 shows an exploded diagram for a first preferred embodiment according to the invention.
Figure 2:
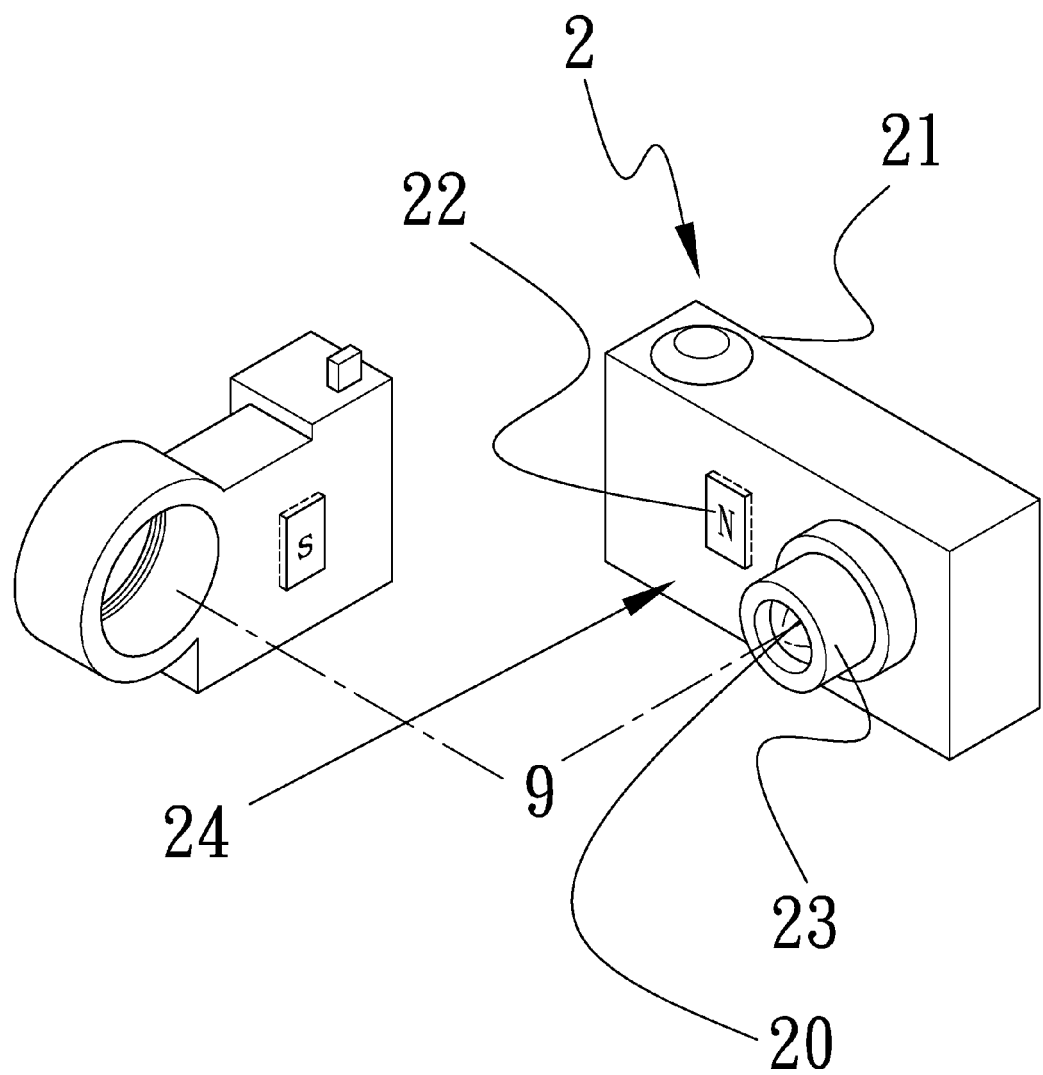
FIG. 2 is a perspective view for the first preferred embodiment according to the invention, showing the connection relationship between the first magnetic unit and the second magnetic unit.
Figure 3:
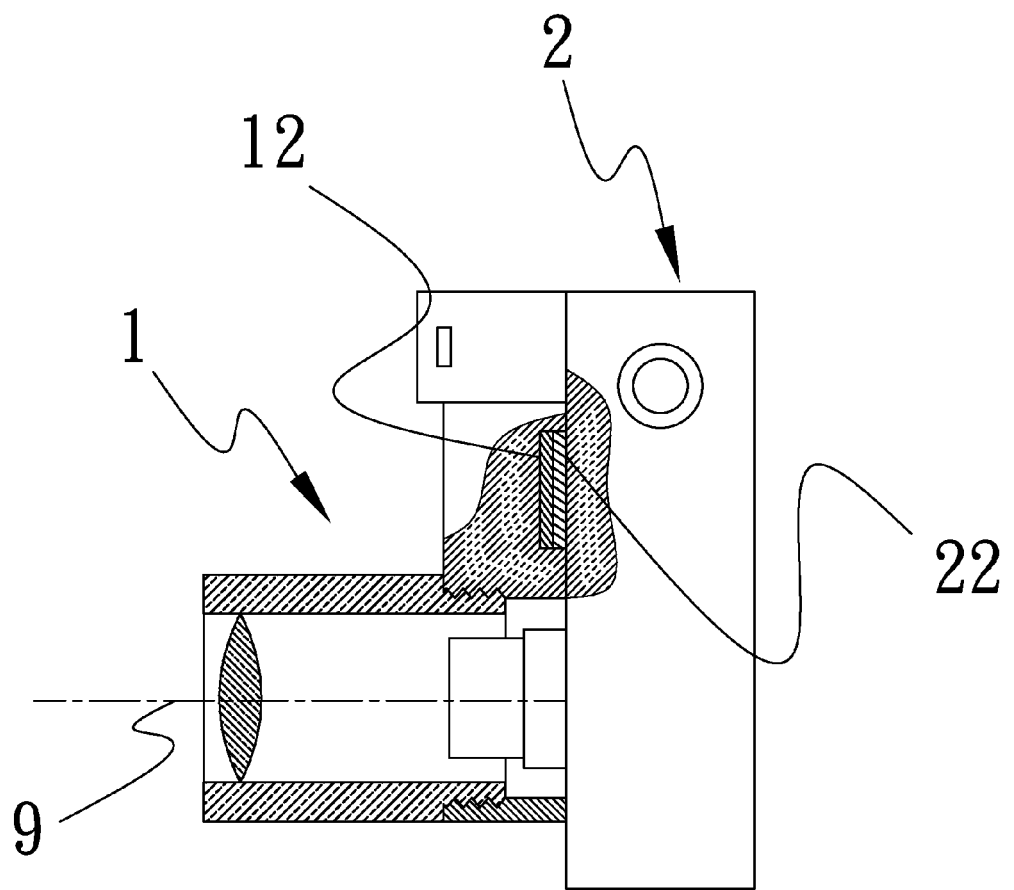
FIG. 3 shows a top cross-sectional view for the first preferred embodiment according to the invention, showing the connection relationship between the first magnetic unit and the second magnetic unit.

For illustrative purpose, the first preferred embodiment according to the invention as shown in FIGS. 1, 2 and 3 takes a digital camera 2 as an example of the image capture device. The digital camera 2 includes a front face 24 from which the lens protrudes, and the front side of the lens is defined as a light entry opening 20. The lens connection module 1 comprises a lens connection body 10 and a second magnetic unit 12 exemplified as a piece of strong magnet. The lens connection body 10 can be further divided into a base unit 14 and an external lens 16. The base unit 14 includes a joint face 140 facing toward of the front face 24 of the image capture device 2, while a light entry face 142 opposite to the joint face 140 for assembly with the external lens 16.

To allow entry of external image light beams into the image capture device 2 through the external lens 16, the base unit 14 has a light collecting pathway 144 penetrating through the joint face 140 and the light entry face 142. Further, in order to adapt to the general external lens 16, the pathway wall 146 of the light collecting pathway 144 is threaded with standard threads near the light entry face 142. The digital camera described herein includes a light collecting lens 23 protruding from the front face 24 of the body 21 and adapted to insert into the light collecting pathway 144 of the base unit 14. The light collecting pathway 144 extends along the light axis 9 of the image capture device 2. As such, external image light beams can be incident into the light entry opening 20 from the external lens 16 via the light collecting pathway 144, and then captured by an optical sensor unit (not shown) in the image capture device 2 through the light collecting lens 23.

Therefore, according to the instructions provided in the user's manual, consumers can attach a strong magnet at a correct position on the front face 24 of the image capture device 2 to serve as a first magnetic unit 22, e.g., with the N pole facing forward, so that the second magnetic unit 12 of the lens connection module 1 can be engaged and installed by means of magnetic attraction. By way of the structural arrangement between the protruded light collecting lens 23 and the light collecting pathway 144, in conjunction with the corresponding magnetic attraction between the second magnetic unit 12 and the first magnetic unit 22, a radially asymmetric arrangement with respect to the light axis 9 is established. A faulty engagement can be effectively prevented during the assembly process, and the detachment of the lens connection module 1 can be easily done by simply separating the two magnetic units with a single hand.

Of course, it is apparent to a person skilled in the art that the external lens 16 described herein is not exclusive but can be replaced by a filter or a polarized lens per the user's need. Therefore, the base unit 14 and the second magnetic unit 12 are together defined as a connection adapter 3, allowing the user to use the connection adapter 3 in conjunction with any peripheral components according to the user's individual requirement.

Figure 4:
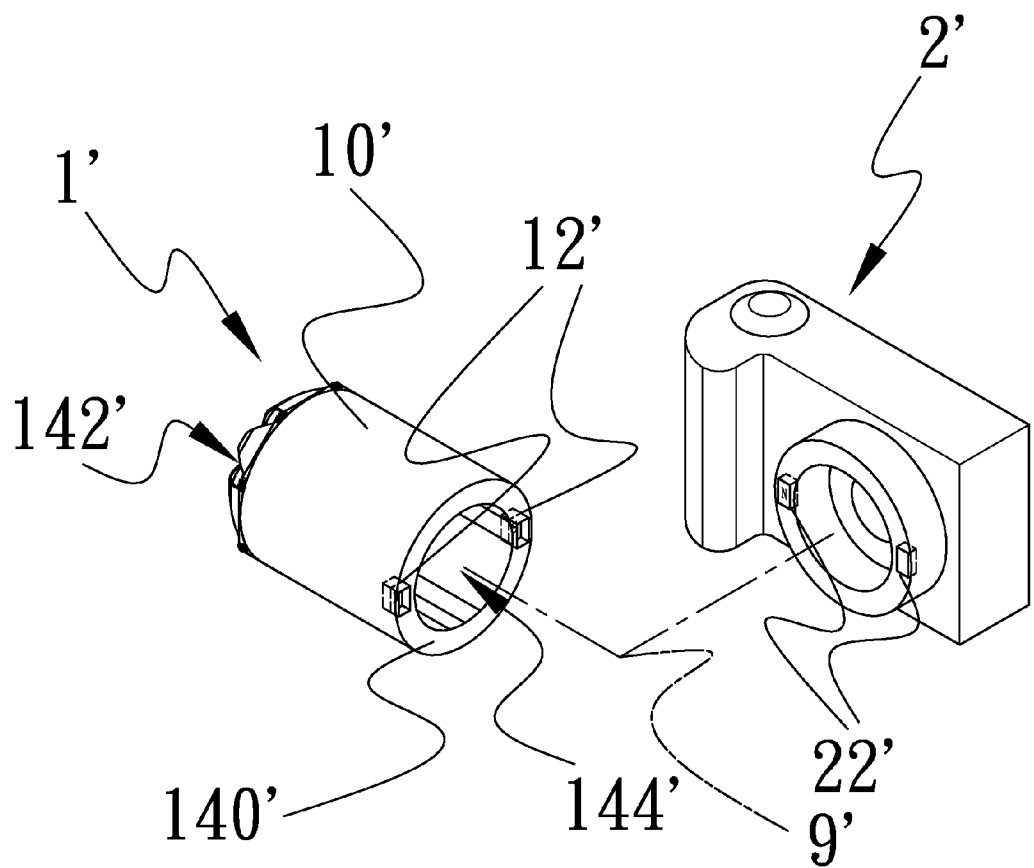
FIG. 4 is a perspective view for a second preferred embodiment according to the invention, showing the lens connection module according to the second preferred embodiment.

In a second preferred embodiment of the invention, a single lens camera including a retractable lens is illustrated, and the lens connection module according to the invention is employed in search of traces of body fluid containing fluorescent proteins during a criminal identification case. As shown in FIG. 4, the lens connection body 10' in the lens connection module 1' is referred to a light collecting lens, in which a light collecting pathway 144' is formed. Similarly, the lens connection body 10' includes a joint face 140' facing toward the image capture device 2' and a light entry face 142' opposite to the joint face 140' and facing toward the photographic scene. A second magnetic unit 12' is installed on the joint face 140'. As illustrated herein, the second magnetic unit 12' comprises a magnet with N pole facing toward the image capture device 2' and an iron block. On the other hand, the first magnetic unit 22' comprises a magnet with N pole facing toward the lens connection module 1' and an iron block corresponding to the magnet portion of the second magnetic unit 12'. In relation to the light axis 9', the first magnetic unit 22' and the second magnetic unit 12' are radially asymmetric engaged, thereby preventing erroneous joint direction.

Figure 5:
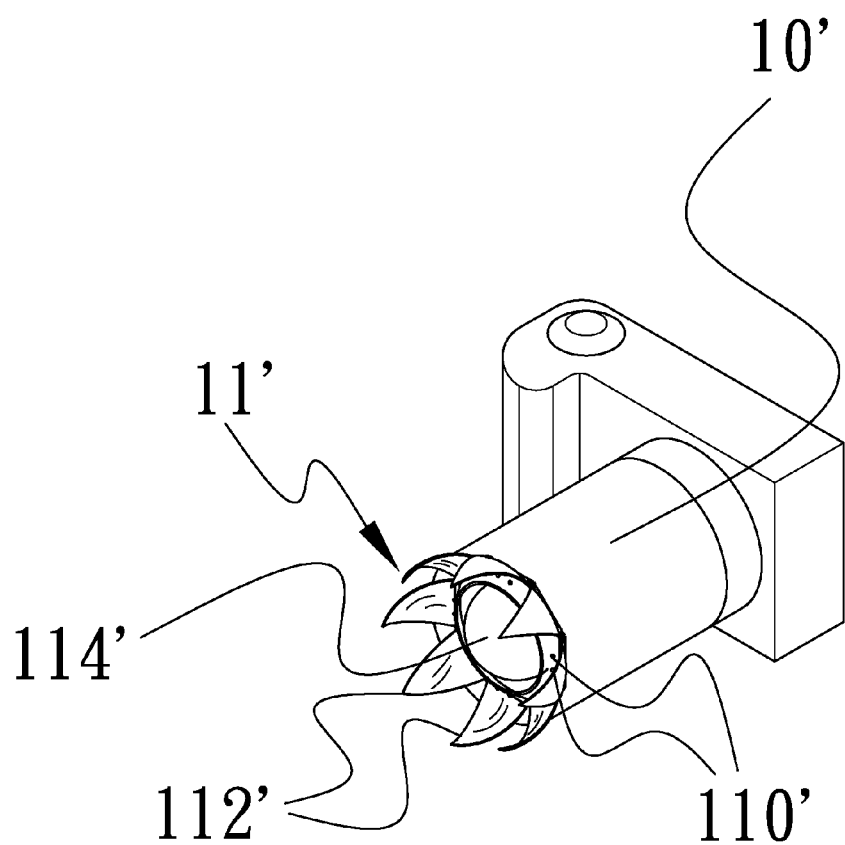
FIG. 5 is an auxiliary perspective view of FIG. 4.

Referring together to FIG. 5, in the case where an optical inspection should be assisted with a ultra-violet (UV) light source, the lens connection module 1' disclosed herein can be further equipped with a light supplement unit 11' per the user's need. In this case, the light supplement unit 11' comprises a plurality of UV light emitting diodes (LEDs) 110' with an adjustable light emission angle, multiple reflective minors 112' with an adjustable angle for reflecting UV light emitted from the LEDs 110', and a UV filter 114'. When traces of fluorescent proteins are discovered in a blood sample or a body fluid, suitable fluorescent image data can be acquired by installing the lens connection module 1' in front of the digital camera to, on one hand, concentrate the UV light emitted by the LEDs 110' on a light supplement position at a suitable distance by the reflective minors 112', and, on the other hand, filtering with the filter 114' the UV components directly reflected from the target object. In this embodiment, the filter 114' acting as an optical lens unit is installed on the pathway wall of the light collecting pathway 144'. Certainly, if it is intended to take a picture of normal white light image as comparison, the user can detach the lens connection module 1' with one hand and natural light environment can be promptly restored for photography.

Figure 6:
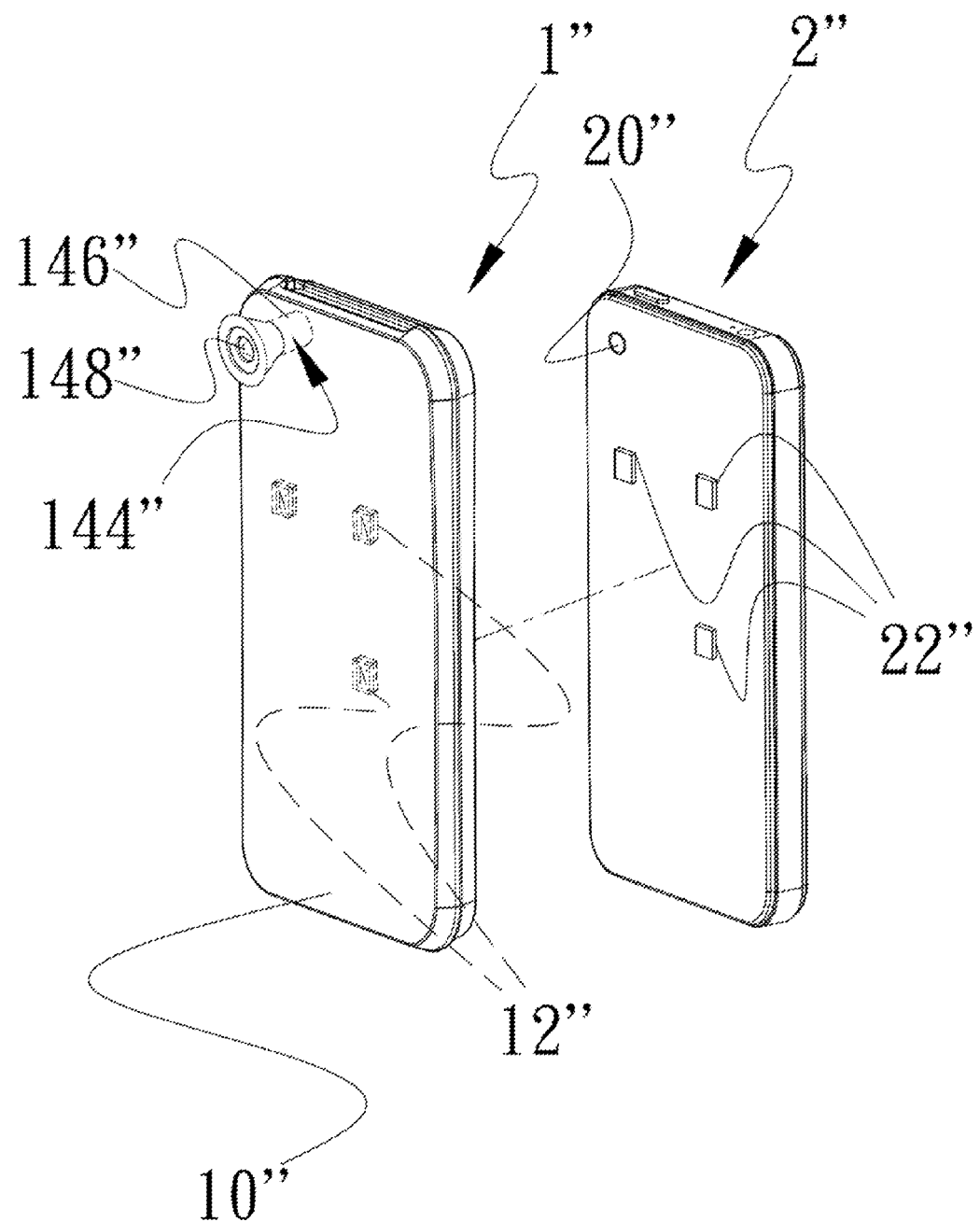
FIG. 6 shows a perspective view for a third preferred embodiment according to the invention, showing the application status of an image capture device exemplified as a camera mobile phone.

Furthermore, camera mobile phones increasingly become more functional and certain mobile phones comprise replaceable cases. According to the third preferred embodiment of the invention shown in FIG. 6, the replaceable case of a mobile phone is preinstalled with three iron blocks, e.g., in a right triangular arrangement, which serve as a first magnetic unit 22". Meanwhile, three corresponding magnets are installed on the lens connection body 10" of the lens connection module 1" at the positions facing toward the mobile phone to serve as the second magnetic unit 12", thereby assuring correct attraction joint by means of asymmetric allocations of the magnetic components. In this way, the light collecting pathway 144" can accurately register with the light entry opening 20" of the image capture device 2" exemplified as a camera mobile phone. As a result, the optical lens unit 148" installed on the pathway walls 146" of the light collecting pathway 144" is successfully arranged in front of the lens in the mobile phone and offers functions like enlargement, filtering, light supplement and so forth, especially features of simple attachment/detachment and error-free disposition, thus fully achieving the objectives of the invention.

It is apparent to those skilled in the art that the lens connection module 1" described above can be completely made of ferro-magnetic material to constitute a second magnetic unit 12". By means of three recesses corresponding to the three magnets in the first magnetic unit 22", for example, the lens connection module 1" can be precisely engaged with the image capture device, taking advantage of the magnetic attraction between the magnets and the ferro-magnetic material. Such a variation falls within the purview of the invention.

It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A lens connection module, adapted for being magnetically mounted on an image capture device, the image capture device having a front face with a lens, the lens having a body protruding from the front face and a light entry opening, the lens connection module comprising:
   a lens connection body configured to removably couple to the image capture device, the lens connection body comprising a base unit with a joint face for facing toward the front face of the image capture device and a light entry face opposite to the joint face, wherein the base unit has a pathway wall defining a light collecting pathway corresponding to the light entry opening and extending along a light axis, wherein the body of the lens protruding from the front face of the image capture device sleeves within an end of the pathway wall of the base unit;
   an external lens removably coupled to another end of the pathway wall in a manner corresponding to the light axis;
   a first magnetic unit including at least one magnetic component arranged on the front face in a radially asymmetric manner with respect to the light axis; and
   a second magnetic unit configured to magnetically engage with the first magnetic unit, the second magnetic unit mounted on the lens connection body and adapted to magnetically connect the joint face to the first magnetic unit, wherein the second magnetic unit includes a magnetic component corresponding to the at least one magnetic component of the first magnetic unit and arranged on the joint face in a radially asymmetric manner with respect to the light axis.

2. The lens connection module according to claim 1, further comprising a light supplement unit.

3. The lens connection module according to claim 2, wherein the light supplement unit includes a plurality of light emitting diodes (LEDs) with an adjustable light exit angle.

4. The lens connection module according to claim 3, wherein the light supplement unit includes a plurality of reflective mirrors with an adjustable angle.

5. The lens connection module according to claim 2, wherein the light supplement unit includes a filter.

6. A connection adapter for a lens connection module, adapted for being magnetically mounted on an image capture device, the image capture device having a front face with a lens, the lens including a body that protrudes from the front face, the lens having a light entry opening, the connection adapter adapted for mounting an external lens in front of the light entry opening of the image capture device, the connection adapter comprising:
   a base unit configured to removably couple to the image capture device, the base unit comprising a joint face for facing toward the light entry opening, wherein the base unit includes a pathway wall which defines a light collecting pathway extending along a light axis, wherein the body of the lens protruding from the front face of the image capture device sleeves within an end of the pathway wall of the base unit and another end of the pathway wall is adapted to removably engage the external lens;
   a first magnetic unit including at least one magnetic component arranged on the front face in a radially asymmetric manner with respect to the light axis and adjacent to the body of the lens; and
   a second magnetic unit configured to magnetically engage with the first magnetic unit, the second magnetic unit mounted on the base unit and adapted to magnetically connect the joint face to the first ferromagnetic unit, wherein the second magnetic unit includes a magnetic component corresponding to the at least one magnetic component of the first magnetic unit and arranged on the joint face in a radially asymmetric manner with respect to the light axis.

* * * * *